(12) United States Patent
Sugimoto

(10) Patent No.: US 11,499,493 B2
(45) Date of Patent: Nov. 15, 2022

(54) MISFIRE DETERMINATION DEVICE OF INTERNAL COMBUSTION ENGINE

(71) Applicant: TOYOTA JIDOSHA KABUSHIKI KAISHA, Toyota (JP)

(72) Inventor: Hitoki Sugimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/391,567

(22) Filed: Aug. 2, 2021

(65) Prior Publication Data

US 2022/0112852 A1    Apr. 14, 2022

(30) Foreign Application Priority Data

Oct. 14, 2020   (JP) .............................. JP2020-172955

(51) Int. Cl.
| | | |
|---|---|---|
| *G01M 15/11* | (2006.01) | |
| *F02D 41/14* | (2006.01) | |
| *F02D 41/00* | (2006.01) | |

(52) U.S. Cl.
CPC ....... *F02D 41/1498* (2013.01); *F02D 41/009* (2013.01); *F02D 41/0097* (2013.01); *F02D 2200/1015* (2013.01); *G01M 15/11* (2013.01)

(58) Field of Classification Search
CPC ............ G01M 15/11; F02D 2200/1015; F02D 2200/1002; F02D 41/1498; F02D 41/009
See application file for complete search history.

(56) References Cited

U.S. PATENT DOCUMENTS

| | | | | |
|---|---|---|---|---|
| 5,278,760 | A * | 1/1994 | Ribbens | ................. F02D 41/22 701/99 |
| 9,261,433 | B2 * | 2/2016 | Ito | ........................... G01M 15/11 |
| 10,281,359 | B2 * | 5/2019 | Jino | ........................ G01M 15/11 |
| 2009/0088956 | A1 * | 4/2009 | Lin | ........................... B60Q 9/00 701/111 |
| 2013/0312504 | A1 * | 11/2013 | Bowman | ............. F02D 41/0097 73/114.05 |
| 2014/0352414 | A1 * | 12/2014 | Ito | ........................... G01M 15/11 73/114.11 |
| 2022/0112853 | A1 * | 4/2022 | Sugimoto | ............... F02D 37/02 |
| 2022/0120252 | A1 * | 4/2022 | Sugimoto | ........... F02D 41/0097 |

FOREIGN PATENT DOCUMENTS

JP    2014-234737 A    12/2014

* cited by examiner

*Primary Examiner* — Gonzalo Laguarda
(74) *Attorney, Agent, or Firm* — Oblon, McClelland, Maier & Neustadt, L.L.P.

(57) ABSTRACT

A misfire determination period is set to a predetermined range of a crank angle. A CPU performs: a calculation process of calculating an average value of a torque of an output shaft of an internal combustion engine in the misfire determination period; a misfire determining process of determining that a misfire has occurred when the calculated average value is less than a prescribed threshold value; and a process of setting the whole misfire determination period to a period in a positive torque range which is a range of a crank angle at which the torque of the output shaft is equal to or greater than zero at the time of normal combustion in which a misfire does not occur.

3 Claims, 3 Drawing Sheets

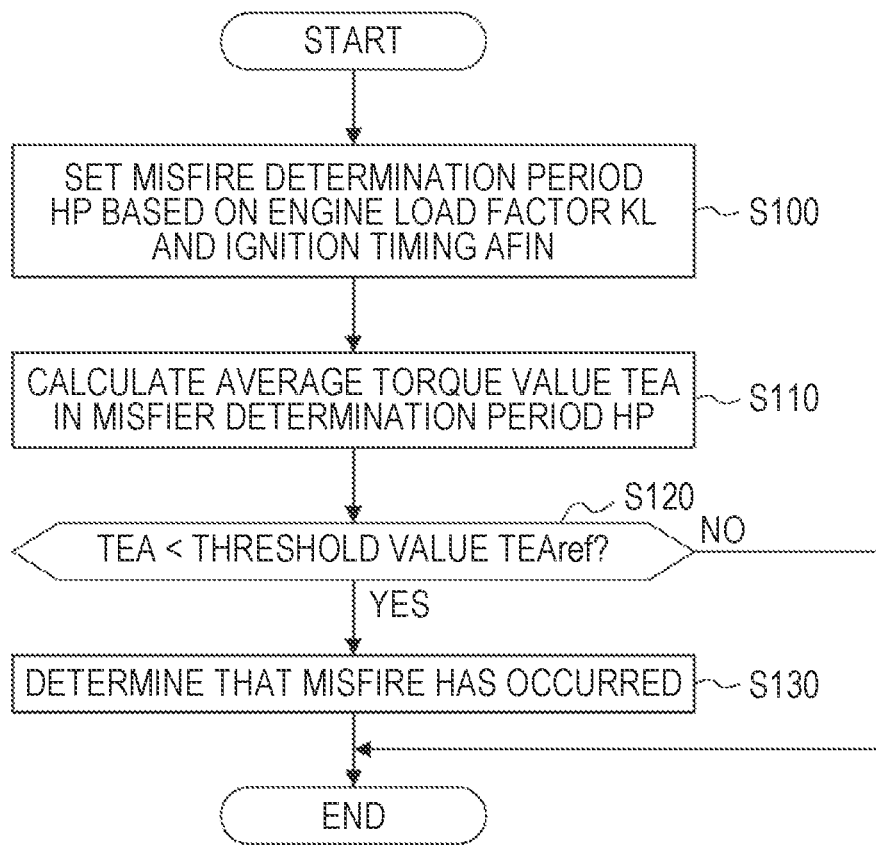

MISFIRE DETERMINATION DEVICE OF INTERNAL COMBUSTION ENGINE

CROSS-REFERENCE TO RELATED APPLICATION

This application claims priority to Japanese Patent Application No. 2020-172955 filed on Oct. 14, 2020, incorporated herein by reference in its entirety.

BACKGROUND

1. Technical Field

The present disclosure relates to a misfire determination device of an internal combustion engine.

2. Description of Related Art

A misfire determination device described in Japanese Unexamined Patent Application Publication No. 2014-234737 (JP 2014-234737 A) has a predetermined range of a crank angle set as a misfire determination period and calculates an average value of a torque of an output shaft of an internal combustion engine in the misfire determination period. The misfire determination device determines that a misfire has occurred when the calculated average value of the torque of the output shaft is less than a prescribed threshold value.

SUMMARY

In an operation state in which the torque of the output shaft is small, since a difference between the average value of the torque of the output shaft at the time of normal combustion and a misfire-determination threshold value is small, there is concern about erroneous determination representing that a misfire has occurred even when combustion is performed normally.

According to an aspect of the present disclosure, there is provided a misfire determination device of an internal combustion engine, the misfire determination device being configured to perform: a calculation process of calculating an average value of a torque of an output shaft of the internal combustion engine in a misfire determination period, the misfire determination period being set to a predetermined range of a crank angle; a misfire determining process of determining that a misfire has occurred when the calculated average value is less than a prescribed threshold value; and a process of setting the whole misfire determination period to a period in a positive torque range which is a range of a crank angle at which the torque of the output shaft is equal to or greater than zero at the time of normal combustion in which a misfire does not occur.

The torque of the output shaft is a combined torque of a combustion torque which is a positive torque generated in a cylinder of an expansion stroke and a compression torque which is a negative torque generated in a cylinder of a compression stroke.

Here, in the second half of the expansion stroke, since the combustion torque decreases and the compression torque increases, the torque of the output shaft is negative. When a crank angle range in which the torque of the output shaft is negative is included in the misfire determination period, the calculated average value decreases. Particularly, in an operation state in which the torque of the output shaft is small, since the average value is less than that in the operation state in which the torque of the output shaft is large, there is a high likelihood that the average value will be less than the misfire-determination threshold value.

In this regard, with the aforementioned configuration, the whole misfire determination period is set to be within the crank angle range in which the torque of the output shaft is a torque equal to or greater than zero at the time of normal combustion in which a misfire does not occur. That is, since a crank angle range in which the torque of the output shaft is negative at the time of normal combustion is excluded from the misfire determination period, the average value is prevented from decreasing in the operation state in which the torque of the output shaft is small. Accordingly, it is possible to prevent erroneous determination representing that a misfire has occurred even when combustion is performed normally.

The misfire determination device may perform a process of setting an end point of the positive torque range to an earlier timing as an engine load becomes smaller. When the engine load decreases, a combustion torque which is a positive torque generated in a cylinder of an expansion stroke decreases and thus a timing at which the combustion torque becomes less than a compression torque which is a negative torque generated in a cylinder of a compression stroke becomes earlier. In this regard, with the aforementioned configuration, since the end point of the positive torque range is set to correspond to such a change of the timing, it is also possible to appropriately set the misfire determination period to a period within the positive torque range.

The misfire determination device may perform a process of setting an end point of the positive torque range to an earlier timing as an ignition timing of the internal combustion engine becomes earlier.

When the ignition timing of the internal combustion engine becomes earlier, a timing at which a combustion torque which is a positive torque generated in a cylinder of an expansion stroke becomes less than a compression torque which is a negative torque generated in a cylinder of a compression stroke becomes earlier. In this regard, with the aforementioned configuration, since the end point of the positive torque range is set to correspond to such a change of the timing, it is also possible to appropriately set the misfire determination period which is set to be within the positive torque range.

A start point of the positive torque range may be set to a crank angle within a prescribed range from a compression top dead center, the crank angle being a crank angle at a timing at which the torque of the output shaft changes from a negative torque to a torque equal to or greater than zero.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a flowchart illustrating a routine of processes which are performed by a control device according to the embodiment.

DETAILED DESCRIPTION OF EMBODIMENTS

Hereinafter, an embodiment of the present disclosure will be described with reference to the accompanying drawings.

Figure 1:
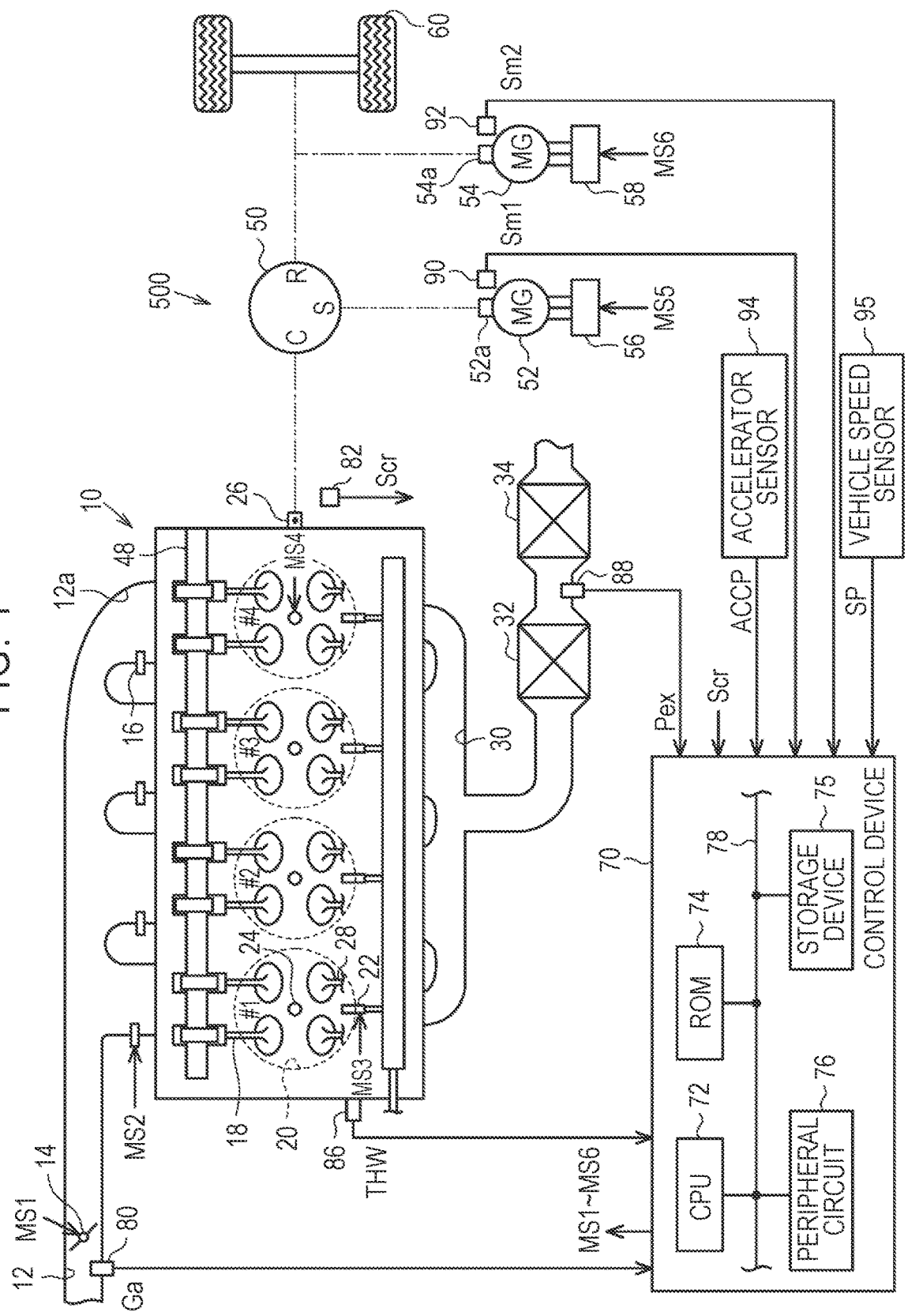
FIG. 1 is a diagram illustrating configurations of a drive system and a control device for an internal combustion engine according to an embodiment.

As illustrated in FIG. 1, an internal combustion engine 10 which is mounted in a vehicle 500 includes four cylinders #1 to #4. A throttle valve 14 is provided in an intake air passage 12 of the internal combustion engine 10. A port injection valve 16 that injects fuel to an intake port 12a is provided in an intake port 12a which is a downstream part in the intake air passage 12. Air taken into the intake air passage 12 or fuel injected from the port injection valve 16 flows into a combustion chamber 20 by an intake valve 18 being opened. Fuel is injected into the combustion chamber 20 from a cylinder injection valve 22. An air-fuel mixture in the combustion chamber 20 is provided for combustion accompanying spark discharge of an ignition plug 24. Combustion energy which is generated at that time is converted to rotation energy of an output shaft 26.

The air-fuel mixture provided for combustion in the combustion chamber 20 is discharged as exhaust gas to an exhaust gas passage 30 by opening an exhaust valve 28. A three-way catalyst 32 having an oxygen storage capacity and a gasoline particulate filter (GPF) 34 are provided in the exhaust gas passage 30. In this embodiment, it is assumed that the GPF 34 has a configuration in which a three-way catalyst is carried in a filter that captures PM.

The output shaft 26 is mechanically connected to a carrier C of a planetary gear mechanism 50 constituting a power split device. A rotation shaft 52a of a first motor generator 52 is mechanically connected to a sun gear S of the planetary gear mechanism 50. A rotation shaft 54a of a second motor generator 54 and driving wheels 60 are mechanically connected to a ring gear R of the planetary gear mechanism 50. An AC voltage is applied to a terminal of the first motor generator 52 by an inverter 56. An AC voltage is applied to a terminal of the second motor generator 54 by an inverter 58. In the vehicle 500 having this configuration, torques from the internal combustion engine 10 and the first motor generator 52 are applied to the output shaft 26.

A control device 70 controls the internal combustion engine 10 and operates operation units of the internal combustion engine 10 such as the throttle valve 14, the port injection valve 16, the cylinder injection valve 22, and the ignition plug 24 such that a torque and an exhaust gas component proportion which are control parameters of the internal combustion engine 10 are controlled. The control device 70 also controls the first motor generator 52 and operates the inverter 56 such that a rotation speed which is a control parameter of the first motor generator 52 is controlled. The control device 70 also controls the second motor generator 54 and operates the inverter 58 such that a torque which is a control parameter of the second motor generator 54 is controlled. Operation signals MS1 to MS6 of the throttle valve 14, the port injection valve 16, the cylinder injection valve 22, the ignition plug 24, and the inverters 56 and 58 are illustrated in FIG. 1.

The control device 70 controls the control parameters of the internal combustion engine 10 with reference to an amount of intake air Ga which is detected by an air flowmeter 80, an output signal Scr from a crank angle sensor 82, a coolant temperature THW detected by a coolant temperature sensor 86, and a pressure of exhaust gas Pex flowing into the GPF 34, which is detected by an exhaust gas pressure sensor 88. The control device 70 controls the control parameters of the first motor generator 52 or the second motor generator 54 with reference to an output signal Sm1 of a first rotation angle sensor 90 that detects a rotation angle of the first motor generator 52 and an output signal Sm2 of a second rotation angle sensor 92 that detects a rotation angle of the second motor generator 54. The control device 70 controls the control parameters of the internal combustion engine 10, the first motor generator 52, and the second motor generator 54 with reference to an accelerator operation amount ACCP which is an amount of depression of an accelerator pedal and which is detected by the accelerator sensor 94 and a vehicle speed SP which is a vehicle speed of the vehicle 500 and which is detected by the vehicle speed sensor 95.

The control device 70 calculates an angular velocity $\omega E$ of the output shaft 26 or an engine rotation speed NE based on the output signal Scr of the crank angle sensor 82. The control device 70 calculates an angular velocity $\omega G$ of a rotor of the first motor generator 52 based on the output signal Sm1 of the first rotation angle sensor 90. The control device 70 calculates an engine load factor KL based on the engine rotation speed NE and the amount of intake air Ga. Here, the engine load factor KL represents a ratio of a current cylinder-flowing air amount to a cylinder-flowing air amount when the internal combustion engine 10 operates normally in a state in which the throttle valve 14 is fully open at a current engine rotation speed NE. The cylinder-flowing air amount is an amount of intake air flowing into the corresponding cylinder in an intake stroke.

The control device 70 includes a CPU 72, a ROM 74, a storage device 75, and a peripheral circuit 76, which are communicatively connected via a communication line 78. Here, the peripheral circuit 76 includes a circuit that generates a clock signal for defining internal operations, a power supply circuit, and a reset circuit. The control device 70 controls the control parameters by causing the CPU 72 to execute a program stored in the ROM 74.

For example, the control device 70 calculates a required torque of the vehicle 500 based on the accelerator operation amount ACCP and the vehicle speed SP. The control device 70 controls the output torques of the internal combustion engine 10, the first motor generator 52, and the second motor generator 54 such that the required torque of the vehicle 500 is satisfied.

The control device 70 sets an ignition timing AFIN of the internal combustion engine 10 based on the engine rotation speed NE, the engine load factor KL, and the like and performs discharge control of the ignition plug 24 such that discharge occurs at the set ignition timing AFIN.

The control device 70 performs a process of determining a misfire in the internal combustion engine 10. The control device 70 that performs the process of determining a misfire constitutes a misfire determination device. Determination of a misfire will be described below.

Figure 2:
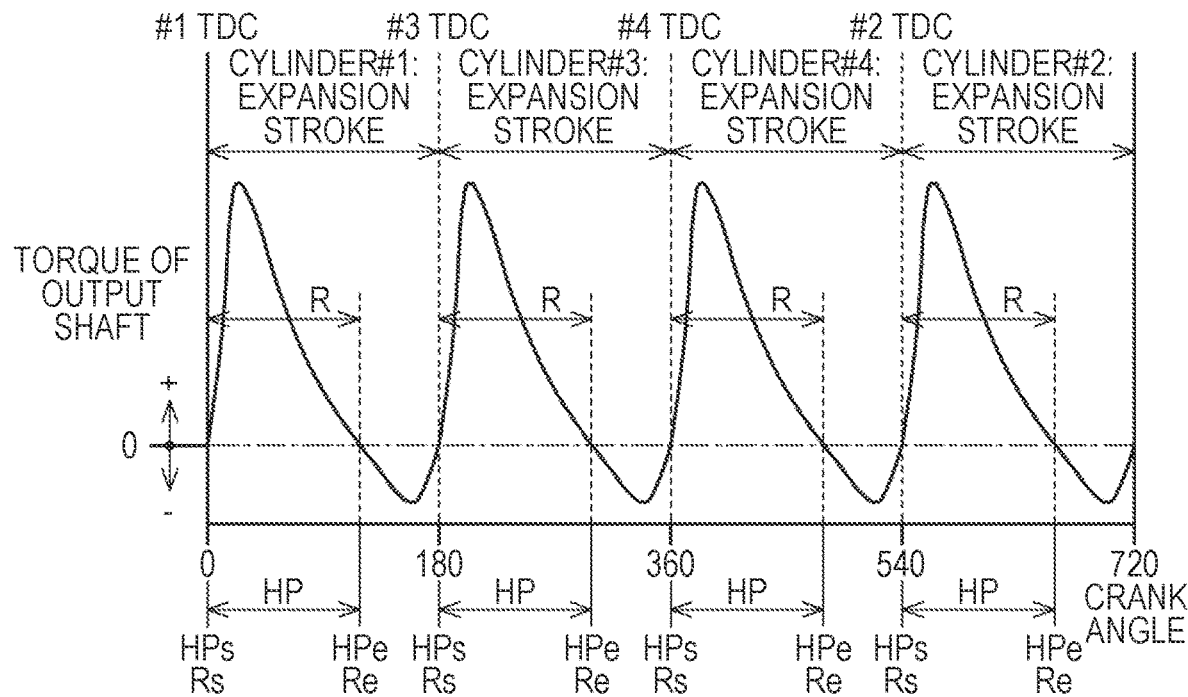
FIG. 2 is a graph illustrating torque variation of an output shaft in one combustion cycle.

As illustrated in FIG. 2, in this embodiment, a misfire determination period HP which is a period in which a misfire in an expansion stroke of each cylinder is determined is set. The control device 70 sequentially calculates the torque TE of the output shaft 26 in the misfire determination period HP and calculates an average torque value TEA which is an average value of the calculated torques TE. When the average torque value TEA is less than a threshold value TEAref, it is determined that a misfire has occurred in the cylinder of the expansion stroke in which the average torque value TEA has been calculated.

Here, the torque of the output shaft 26 is a combined torque of a combustion torque which is a positive torque generated in a cylinder of an expansion stroke and a compression torque which is a negative torque generated in a cylinder of a compression stroke, but the torque TE of the output shaft 26 is negative in the second half of the expansion stroke because the combustion torque decreases and the compression torque increases. When a crank angle range in which the torque TE is negative is included in the misfire determination period HP, the calculated value of the average torque value TEA decreases. Particularly, in an operation state in which the torque of the output shaft 26 is small such as an idle operation, since the average torque value TEA is smaller than that in an operation state in which the torque of the output shaft 26 is large, there is a high likelihood that the average torque value TEA will be less than the misfire-determination threshold value TEAref That is, there is concern about erroneous determination representing that a misfire has occurred even when combustion is performed normally.

Therefore, as illustrated in FIG. 2, in this embodiment, a positive torque range R which is a crank angle range in which the torque of the output shaft 26 is equal to or greater than zero at the time of normal combustion in which a misfire does not occur is acquired in advance and the misfire determination period HP is set such that the whole misfire determination period HP is included in the positive torque range R.

For example, in this embodiment, a start point Rs of the positive torque range R is set to a start timing HPs of the misfire determination period HP and an end point Re of the positive torque range R is set to an end timing HPe of the misfire determination period HP such that the positive torque range R matches the misfire determination period HP.

The start point of the positive torque range R is a crank angle in a prescribed range from a compression top dead center TDC and is a crank angle at a timing at which the torque of the output shaft 26 changes from a negative torque to a torque equal to or greater than zero. For example, at the compression top dead center TDC of each cylinder, since two cylinders are at top dead centers, two other cylinders are at bottom dead centers, and a piston speed in each cylinder is almost "0," the torque of the output shaft 26 is "0." Accordingly, in this embodiment, the compression top dead center TDC is set as the start point Rs of the positive torque range R. In consideration of a shift of the timing at which the torque is "0," a crank angle obtained by adding a predetermined crank angle (for example, about 0 to 30° CA) to the compression top dead center TDC may be set as the start point Rs of the positive torque range R. This setting of the start point of the positive torque range R may be performed in the same way regardless of the number of cylinders.

On the other hand, the end point Re of the positive torque range R varies depending on the engine load factor KL or the ignition timing AFIN.

That is, when the engine load factor KL is small, the combustion torque which is generated in a cylinder of an expansion stroke decreases and thus the timing at which the combustion torque becomes less than the compression torque becomes earlier. That is, the end point Re of the positive torque range R becomes earlier as the engine load factor KL becomes smaller.

Figure 3:
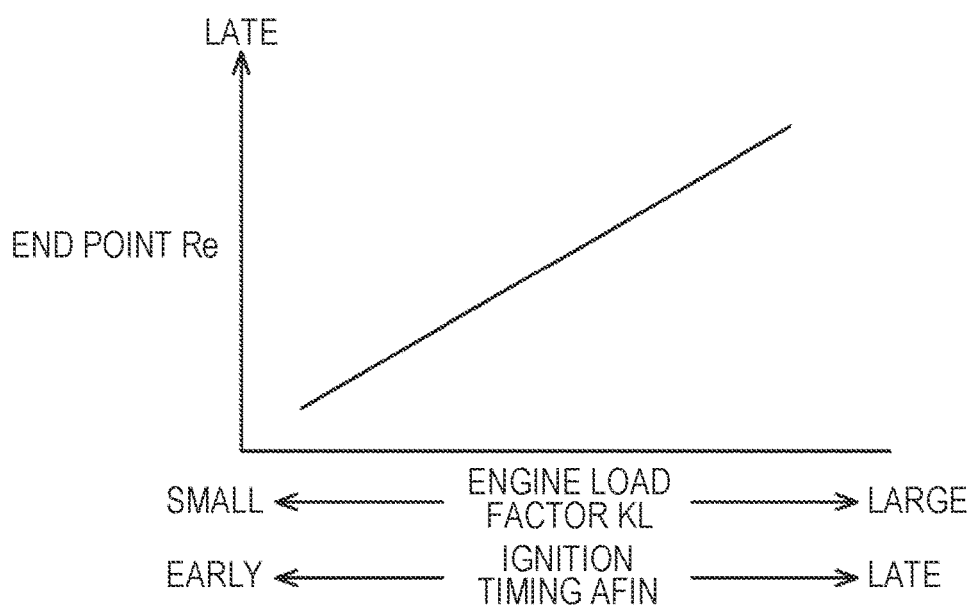
FIG. 3 is a graph illustrating relationships of an engine load factor and an ignition timing with an end point.

Therefore, as illustrated in FIG. 3, the end timing HPe is set to be variable such that the end timing HPe corresponding to the end point Re becomes earlier as the engine load factor KL becomes smaller. Regarding the ignition timing AFIN, similarly, the timing at which the combustion torque becomes less than the compression torque becomes earlier as the ignition timing AFIN becomes earlier to be closer to a timing on an advance side. That is, the end point Re of the positive torque range R becomes earlier as the ignition timing AFIN becomes earlier.

Therefore, as illustrated in FIG. 3, the engine timing HPe is set to be variable such that the end timing HPe corresponding to the end point Re becomes earlier as the ignition timing AFIN becomes earlier. A routine of processes which are performed by the control device 70 to perform the aforementioned misfire determination is illustrated in FIG. 4. The routine illustrated in FIG. 4 is performed by causing the CPU 72 to execute a program stored in the ROM 74. Step numbers of the processes are expressed by numerals prefixed with "S" in the following description.

In a series of processes illustrated in FIG. 4, the CPU 72 acquires an engine load factor KL and an ignition timing AFIN and sets a misfire determination period HP based on the acquired values (S100). In S100, the CPU 72 performs a process of setting the whole misfire determination period HP to a period in the positive torque range R. More specifically, the start point Rs is set as a start timing HPs of the misfire determination period HP and the end point Re is set as the end timing HPe of the misfire determination period HP. The end point Re set as the end timing HPe at this time is set to be variable based on the acquired engine load factor KL or the acquired ignition timing AFIN as illustrated in FIG. 3.

Then, the CPU 72 calculates an average torque value TEA in the misfire determination period HP (S110). In S110, the CPU 72 sequentially calculates the torque TE of the output shaft 26 in the misfire determination period HP based on Expression (1). For example, the CPU 72 calculates the torque TE of the output shaft 26 in the misfire determination period HP for each 1° CA. Then, the average torque value TEA which is an average value of the calculated torques TE is calculated.

$$TE = IE * d\omega E + (1+\rho)/\rho * (IG * d\omega G - TG) \qquad (1)$$

Here, IE represents a moment of inertia of the internal combustion engine 10, dωE represents an angular acceleration obtained by differentiating the angular velocity ωE of the output shaft 26, ρ represents a gear ratio of the planetary gear mechanism 50, IG represents a moment of inertia of the first motor generator 52, dωG represents an angular acceleration obtained by differentiating the angular velocity ωG of the rotor of the first motor generator 52, and TG represents a torque reaction force of the first motor generator 52.

In Expression (1), the moment of inertia IE of the internal combustion engine 10, the moment of inertia IG of the first motor generator 52, and the gear ratio ρ of the planetary gear mechanism 50 are physical quantities which have been input to the ROM 74 in advance and are constants. The torque reaction force TG of the first motor generator 52 is a control parameter, has a value managed by the CPU 72, and is normally input to the CPU 72.

Then, the CPU 72 determines whether the calculated average torque value TEA is less than the threshold value TEAref (S120). The threshold value TEAref is a lower limit of the torque which is generated in the output shaft 26 when combustion is performed normally without causing a misfire and is set to a value which varies appropriately depending on the engine load factor KL or the ignition timing AFIN.

When it is determined that the average torque value TEA is equal to or greater than the threshold value TEAref (S120: NO), the CPU 72 ends this routine. On the other hand, when it is determined that the average torque value TEA is less than the threshold value TEAref (S120: YES), the CPU 72 determines that a misfire has occurred (S130) and then ends this routine.

Operations and advantages of this embodiment will be described below.

(1) The whole misfire determination period HP is set to be within the crank angle range in which the torque of the output shaft 26 is a torque equal to or greater than zero at the time of normal combustion in which a misfire does not occur. That is, since a crank angle range in which the torque of the output shaft 26 is negative at the time of normal combustion is excluded from the misfire determination period HP, the average torque value TEA is prevented from decreasing in an operation state in which the torque of the output shaft 26 is small. Accordingly, it is possible to prevent erroneous determination representing that a misfire has occurred even when combustion is performed normally.

(2) As described above, when the engine load decreases, a combustion torque which is a positive torque generated in a cylinder of an expansion stroke decreases and thus a timing at which the combustion torque becomes less than a compression torque which is a negative torque generated in a cylinder of a compression stroke becomes earlier. Therefore, in this embodiment, through the process of S100, the end point Re of the positive torque range R is set to an earlier timing as the engine load factor KL becomes smaller and the end point Re is set as the end timing HPe of the misfire determination period HP. Accordingly, since the end point Re of the positive torque range R is set to correspond to such a change of the timing, it is also possible to appropriately set the misfire determination period HP to a period within the positive torque range.

(3) As described above, when the ignition timing of the internal combustion engine becomes earlier, a timing at which a combustion torque which is a positive torque generated in a cylinder of an expansion stroke becomes less than a compression torque which is a negative torque generated in a cylinder of a compression stroke becomes earlier. Therefore, in this embodiment, through the process of S100, the end point Re of the positive torque range R is set to an earlier timing as the ignition timing AFIN becomes earlier and the end point Re is set as the end timing HPe of the misfire determination period HP. Accordingly, since the end point Re of the positive torque range R is set to correspond to such a change of the timing, it is also possible to appropriately set the misfire determination period HP to a period within the positive torque range.

The aforementioned embodiment can be modified as follows. The aforementioned embodiment and the following modified examples can be combined unless technical conflictions arise.

The end point Re is set to be variable based on both the engine load factor KL and the ignition timing AFIN, but the end point Re may be set to be variable based on one of the engine load factor KL and the ignition timing AFIN.

The end point Re may be set to a fixed value. In this case, it is preferable to set the end point Re to an earliest timing out of an end point Re varying depending on an engine operation state.

In the aforementioned embodiment, the positive torque range R is matched with the misfire determination period HP by setting the start point Rs of the positive torque range R as the start timing HPs of the misfire determination period HP and setting the end point Re of the positive torque range R as the end timing HPe of the misfire determination period HP. Also, a partial period in the positive torque range R may be set as the whole misfire determination period HP by setting the start timing HPs to a timing later than the start point Rs or setting the end timing HPe to a timing earlier than the end point Re.

In the aforementioned embodiment, torques from the internal combustion engine 10 and the first motor generator 52 are applied to the output shaft 26, but a torque from the second motor generator 54 may be applied to the output shaft 26. In this case, the torque TE of the output shaft 26 can be calculated in consideration of the torque from the second motor generator 54.

In the aforementioned embodiment, the configuration of the vehicle 500 is not limited to the example described in the embodiment. For example, a vehicle in which the first motor generator 52 and the second motor generator 54 is not mounted and only the internal combustion engine 10 is mounted as a driving force source may be employed. In such a vehicle in which only the internal combustion engine 10 is mounted, the torque of the output shaft 26 may be calculated with the term $(1+\rho)/\rho*(IG*d\omega G-TG)$ in Expression (1) omitted. In this case, a term for reflecting a reaction force or the like applied to the output shaft 26 due to an influence of a torque may be added to Expression (1).

In the aforementioned embodiment, Expression (1) is used to calculate a torque TE, but the torque may be calculated using another expression or method. For example, the torque reaction force TG in Expression (1) may be omitted.

The control device 70 is not limited to a control device including a CPU 72 and a ROM 74 and performing software processes. For example, a dedicated hardware circuit such as an ASIC that performs at least some of the software processes performed in the aforementioned embodiment in software may be provided. That is, the control device may have at least one of the following configurations (a) to (c): (a) a configuration in which a processor that performs all the processes in accordance with a program and a program storage device such as a ROM that stores the program are provided; (b) a configuration in which a processor that performs some of the processes in accordance with a program, a program storage device, and a dedicated hardware circuit that performs the other processes are provided; and (c) a configuration in which a dedicated hardware circuit that performs all the processes is provided. Here, the number of software executing devices including a processor and a program storage device or the number of dedicated hardware circuits may be two or more.

The number of cylinders of the internal combustion engine is not limited to four and may be, for example, six or eight.

The internal combustion engine does not have to include the port injection valve 16 and the cylinder injection valve 22.

The internal combustion engine is not limited to a spark-ignition internal combustion engine such as a gasoline engine, and for example, a compression-ignition internal combustion engine using diesel as fuel may be employed.

What is claimed is:

1. A misfire determination device of an internal combustion engine, the misfire determination device being configured to perform:

a calculation process of calculating an average value of a torque of an output shaft of the internal combustion engine in a misfire determination period, the misfire determination period being set to a predetermined range of a crank angle;

a misfire determining process of determining that a misfire has occurred when the calculated average value is less than a prescribed threshold value; and a process of setting the whole misfire determination period to a period in a positive torque range which is a range of a crank angle at which the torque of the output shaft is equal to or greater than zero at the time of normal combustion in which a misfire does not occur, wherein a start point of the positive torque range is set to a crank angle within a prescribed range from a compression top dead center, the crank angle being a crank angle at a timing at which the torque of the output shaft changes from a negative torque to a torque equal to or greater than zero.

2. The misfire determination device of an internal combustion engine according to claim 1, wherein the misfire determination device performs a process of setting an end point of the positive torque range to an earlier timing as an engine load becomes smaller.

3. The misfire determination device of an internal combustion engine according to claim 1, wherein the misfire determination device performs a process of setting an end point of the positive torque range to an earlier timing as an ignition timing of the internal combustion engine becomes earlier.

* * * * *